Oct. 23, 1951 B. AMOS 2,572,424
FREQUENCY MODULATION RATIO DETECTOR
Filed Sept. 11, 1947
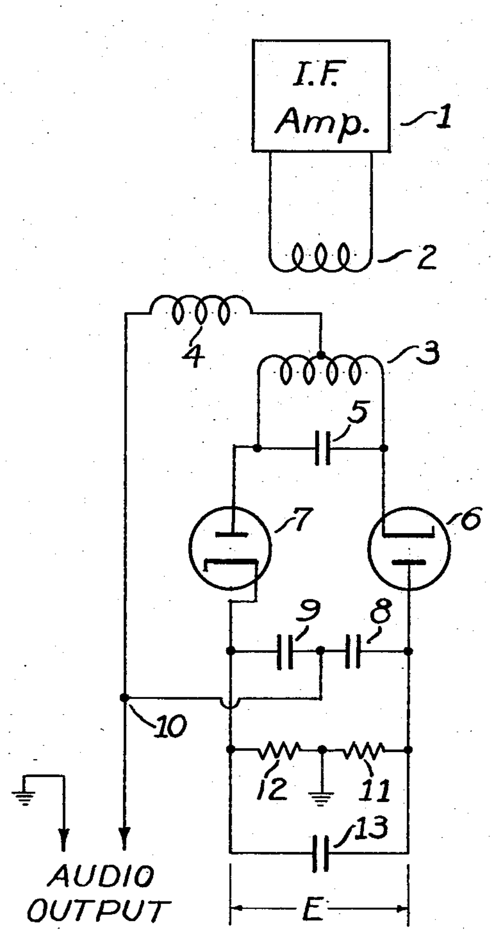
Bernard Amos, INVENTOR.
BY Charles W. Mortimer
ATT.

Patented Oct. 23, 1951

2,572,424

UNITED STATES PATENT OFFICE 2,572,424

FREQUENCY MODULATION RATIO DETECTOR

Bernard Amos, North Arlington, N. J., assignor to Allen B. Du Mont Laboratories, Inc., Passaic, N. J., a corporation of Delaware Application September 11, 1947, Serial No. 773,413

4 Claims. (Cl. 250—27)

This invention relates to improvements in frequency modulation ratio detectors for detecting frequency modulated radio signals.

The conventional FM ratio detector operates as a half-wave rectifier. The circuit parameters are such that the conduction angle of the diodes change when there is amplitude modulation present on the FM carrier.

A reflected impedance that depends upon the diode conduction angle and the load resistors appears across the secondary of the ratio detector transformer. This reflected impedance determines the operating Q of the secondary circuit. Amplitude limiting is accomplished by the change in the diode conducting angle and the consequent change in the Q of the secondary circuit. Lower values of load resistors make it possible to obtain a larger change in the secondary Q and therefore better amplitude limiting. However, better audio recovery is achieved with a higher value of load resistor. For best results a compromise should be made between audio recovery and amplitude limiting.

The invention may be understood from the description in connection with the accompanying drawing which shows a schematic circuit embodying the invention.

Reference character 1 indicates an intermediate frequency amplifier of the known sort for use in a frequency modulation receiver. The output of this amplifier is coupled to the primary winding 2 of a transformer. Secondary and tertiary windings 3 and 4, respectively, are provided for this transformer. The secondary winding is tuned by capacitor 5. The tertiary winding 4 has one end thereof connected to the electrical midpoint of the secondary winding 3. Diode 7 has its plate connected to one end of coil 3 and the cathode of diode 6 is connected to the other end of this coil. By-pass condensers 8 and 9 in series have one side connected to lead 10 from one end of winding 4.

Opposite sides of condensers 8 and 9 are connected across the diode load resistors 11 and 12, which are in series and are of the sort known as negative temperature co-efficient resistors.

A large capacitor 13 is connected across the outer ends of load resistors 11 and 12 to stabilize the sum of the D. C. voltages which appear across these resistors. The audio output voltage appears between ground and the end of the winding 4 which is connected to the juncture of the two capacitors 8 and 9.

The circuit described above is a conventional ratio-detector circuit, well known to the art. The invention resides in the use of high negative temperature co-efficient resistors as the diode load resistors 11 and 12.

The operation is as follows:

With a negative temperature co-efficient resistor, the resistance decreases as the current increases, so that as the received carrier level increases, the voltage E increases, which causes the current through resistors 11 and 12 to increase, decreasing the resistance of these resistors. As mentioned above, lower values of load resistance improve the amplitude limiting capabilities, whereas high values of load resistors improve the audio recovery. Thus the amplitude limiting improves with a higher carrier level and the audio recovery improves with a lower carrier level.

What is claimed is:

1. A receiver circuit for frequency modulated signals comprising a ratio detector circuit having a rectifier element and a resistor connected to said rectifier element as load resistance in said detector circuit, the said resistor having a negative temperature coefficient of resistance.

2. A receiver circuit for frequency modulated signals comprising a ratio detector circuit having a pair of non-linear detector elements connected in series and a resistor connected as load resistance to each said element, each said resistor having a negative temperature coefficient of resistance.

3. A receiver circuit for frequency modulated signals comprising a detector circuit having a pair of diodes connected in series and a pair of resistors connected respectively as load resistance to each of said diodes, said resistors having a negative temperature coefficient of resistance.

4. A receiver circuit for frequency modulated signals comprising a detector circuit including two diodes, a pair of capacitors connected in series between the plate of one diode and the cathode of the other diode, the common terminal of said capacitors forming one output terminal for the detector circuit, a pair of series resistors connected in parallel across said capacitors, the common terminal of said resistors forming the other output terminal for said detector circuit and an additional capacitor connected across said series resistors, said resistors having a negative temperature coefficient.

BERNARD AMOS.

REFERENCES CITED

The following references are of record in the file of this patent:

UNITED STATES PATENTS

| Number | Name | Date |
|---|---|---|
| 2,248,785 | Van B. Roberts | July 8, 1941 |
| 2,250,581 | Heinecke | July 29, 1941 |
| 2,417,844 | Scully | Mar. 25, 1947 |

OTHER REFERENCES

"Radio" for October 1945, pages 18, 19 and 20.